United States Patent
May et al.

[11] Patent Number: 5,835,536
[45] Date of Patent: Nov. 10, 1998

[54] METHOD AND APPARATUS FOR REDUCING PEAK-TO-AVERAGE REQUIREMENTS IN MULTI-TONE COMMUNICATION CIRCUITS

[75] Inventors: Michael R. May; Terence L. Johnson, both of Austin; Matthew A. Pendleton, Cedar Park, all of Tex.

[73] Assignee: Motorola, Inc., Schaumburg, Ill.

[21] Appl. No.: 383,026

[22] Filed: Feb. 2, 1995

[51] Int. Cl.$^6$ ....................................................... H04K 1/10
[52] U.S. Cl. ........................................... 375/316; 375/296
[58] Field of Search ................................... 375/316, 260, 375/295, 259, 362, 285, 361, 296, 231; 370/69.1, 110.2, 110.3, 317, 319, 525, 526

[56] References Cited

U.S. PATENT DOCUMENTS

| | | | |
|---|---|---|---|
| 5,201,071 | 4/1993 | Webb | 455/101 |
| 5,271,038 | 12/1993 | Cai | 375/317 |
| 5,400,322 | 3/1995 | Hunt et al. | 370/19 |
| 5,519,731 | 5/1996 | Cioffi | 375/260 |
| 5,539,777 | 7/1996 | Grube et al. | 375/316 |

FOREIGN PATENT DOCUMENTS

| | | | |
|---|---|---|---|
| 0594358A2 | 4/1994 | European Pat. Off. | H03G 3/02 |
| 2270819 | 3/1994 | United Kingdom | H04J 1/02 |

OTHER PUBLICATIONS

A.E. Jones, et al., "Block coding scheme for reduction of peak to mean envelope power ratio of multi–carrier transmission schemes", Electronics Ltrs. 8th Dec. 1994, vol. 30, No. 25, pp. 2098–2099.

Amati Communications Corporation; "ADSL and Discrete Multitone (DMT);" (1993).

K. Maxwell & J. M. Cioffi; "Spectral Compatibility Advantages of DMT;" (Mar. 8, 1993).

*Primary Examiner*—Tesfaldet Bocure
*Assistant Examiner*—Bryan Webster

[57] ABSTRACT

A symbol generator (804) generates a time-domain discrete multi-tone symbol (810). A magnitude comparator (812) compares the magnitude of the time-domain discrete multi-tone symbol (810) with a magnitude threshold. When the magnitude of the time-domain discrete multi-tone symbol (810) compares unfavorably to the magnitude threshold, a magnitude adjusting symbol (816) is added to the time-domain discrete multi-tone symbol (810) such that the magnitude of the time-domain discrete multi-tone symbol (810) is reduced, thereby reducing the peak-to-average requirements (PAR).

16 Claims, 10 Drawing Sheets

FIG.3 -PRIOR ART-

METHOD AND APPARATUS FOR REDUCING PEAK-TO-AVERAGE REQUIREMENTS IN MULTI-TONE COMMUNICATION CIRCUITS

FIELD OF THE INVENTION

This invention relates generally to circuits and in particular to a method and apparatus for reducing peak-to-average requirements in multi-tone communication circuits.

BACKGROUND OF THE INVENTION

In order to make high data rate interactive services such as video conferencing available to more residential and small business customers, high-speed data communication paths are required. Although fiber optic cable is the preferred transmission media for such high data rate services, it is not readily available in existing communications networks, and the expense of installing fiber optic cable is prohibitive. Current telephone wiring connections, which consist of copper twisted-pair media, are not designed to support the data rates, or bandwidth, required for interactive services. Asymmetric Digital Subscriber Lines (ADSL) technology has been developed to increase the effective bandwidth of existing twisted-pair connections, allowing interactive services to be provided without requiring the installation of new fiber optic cable.

Discrete Multi-Tone (DMT) is a multicarrier technique that divides the available bandwidth of twisted-pair connections into many subchannels. The DMT technique has been adopted by the ANSI T1E1.4 (ADSL) committee for use in ADSL systems. In ADSL, DMT is used to generate 250 separate 4.3125 kHz subchannels from 26 kHz to 1.1 MHz for downstream transmission to the enduser, and 26 subchannels from 26 kHz to 138 kHz for upstream transmission by the enduser. The transmission capability of the individual subchannels are evaluated for each connection, and data is allocated to the subchannels according to their transmission capabilities (the number of bits each subchannel can support). Subchannels that are not capable of supporting data transmission are not used, whereas the bit-carrying capacity of subchannels that can support transmission is maximized. Thus, by using DMT in an ADSL system, the transmission capability of each twisted-pair connection is maximized over the fixed bandwidth.

Once the transmission capability of a connection has been established, the data transfer process begins by encoding the data. Data in an ADSL system is grouped in frames, where a frame represents a time-slice of the data to be transmitted. Bits from the frames are assigned to the subchannels based on the number of bits that each subchannel can support, and the subchannels are encoded by creating a frequency-domain vector set. Frequency-domain vectors in the vector set use phase and magnitude components to encode the values of the bits. An Inverse Fast Fourier Transform (IFFT) performs a frequency-to-time conversion of the frequency-domain vectors, resulting in digital time-domain information. A digital-to-analog converter (DAC) then converts the digital information to an analog signal which a transmitter transmits onto the copper twisted-pair media. The ANSI T1E1.4 standard defines the average power requirement of the signal for transmission on the twisted pair media, and in order to satisfy the power requirement, an amplifier is required.

When the analog signal from the DAC overshoots a magnitude threshold, which is dependent on the power supply used in the system, clipping of the signal can occur. Peaks in the analog signal occur when the vectors in the frequency-domain vector set are combined through the IFFT. Each frequency-domain vector contributes to the magnitude of the time-domain signal, and if the frequency-domain vectors are such that their contributions are concentrated in one area of the time-domain signal, peaks can result. Clipping occurs when the Integrated Circuit (IC) on which the transmitter is fabricated cannot support the dynamic range requirements of the peaking signal and can result in the loss of information. Section 7.11.1 of the T1E1.4 standard addresses this problem and limits the information loss by specifying that the probability of the signal clipping be less than one in 10 million.

The probability of a peak exceeding the magnitude threshold (maximum signal power on the IC) is based on the Peak-to-Average Ratio (PAR) of the signal, which is a ratio of the maximum power of the signal to the average power of the signal. If the average power is small compared to the magnitude threshold, a large peak can occur without exceeding the point where clipping occurs. Therefore, one method of reducing the number of peaks exceeding the magnitude threshold for a fixed PAR is to reduce the average power of the signal. Although this reduces the occurrence of clipping, lower signal strength increases susceptibility to noise, which can cause other transmission problems. Another method of reducing the probability of clipping utilizes a larger power supply, which raises the magnitude threshold where clipping occurs. A larger power supply, however, increases cost and consumes excessive power and adds additional regulatory requirements.

Therefore, a need exists for a method and apparatus to reduce the occurrence of signal peaks in a DMT transmitter such that the power supply of the system can be reduced, the signal strength can be raised, and/or the probability of the signal clipping can be reduced.

DETAILED DESCRIPTION OF THE DRAWINGS

Generally, the present invention provides a method and apparatus for reducing peak-to-average requirements in discrete multi-tone communication circuits. This is accomplished by generating a time-domain discrete multi-tone symbol, and comparing magnitude of the time-domain discrete multi-tone symbol with a magnitude threshold. When the magnitude of the time-domain discrete multi-tone symbol compares unfavorably to the magnitude threshold, a magnitude adjusting symbol is added to the time-domain discrete multi-tone symbol such that the magnitude of the time-domain discrete multi-tone symbol is reduced, thereby reducing the peak-to-average requirements (PAR). With such a method and apparatus, the occurrence of signal peaks in a DMT transmitter is reduced such that the power supply of the system can be reduced, the signal strength can be raised, and/or the probability of the signal clipping can be reduced.

Figure 1:
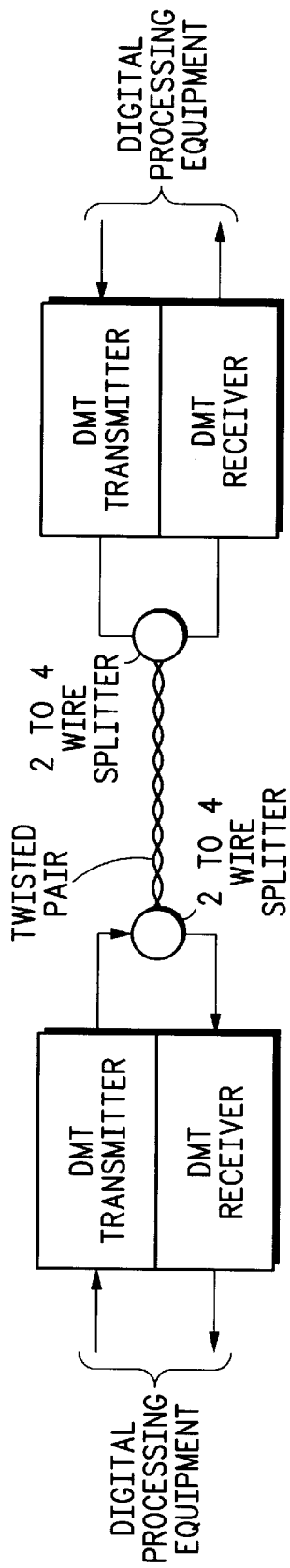
FIG. 1 illustrates, in a block diagram, a prior art multi-tone communications system.

FIG. 1 illustrates a block diagram of a multi-tone communication system. Data is communicated between digital processing equipment stations via Discrete Multi-Tone (DMT) transmitters and receivers which are coupled together using a twisted pair interface. One of the digital processing equipment stations may represent a residential system, whereas the other may be an interactive services provider such as video conferencing. The high speed transmission (downstream) path is from the interactive services provider to the residential system, and the lower speed transmission path is from the residential system to the interactive services provider. Because transmission occurs in both directions, each set of digital processing equipment requires a DMT transmitter and a DMT receiver, each of which is coupled to the twisted pair interface.

Figure 2:
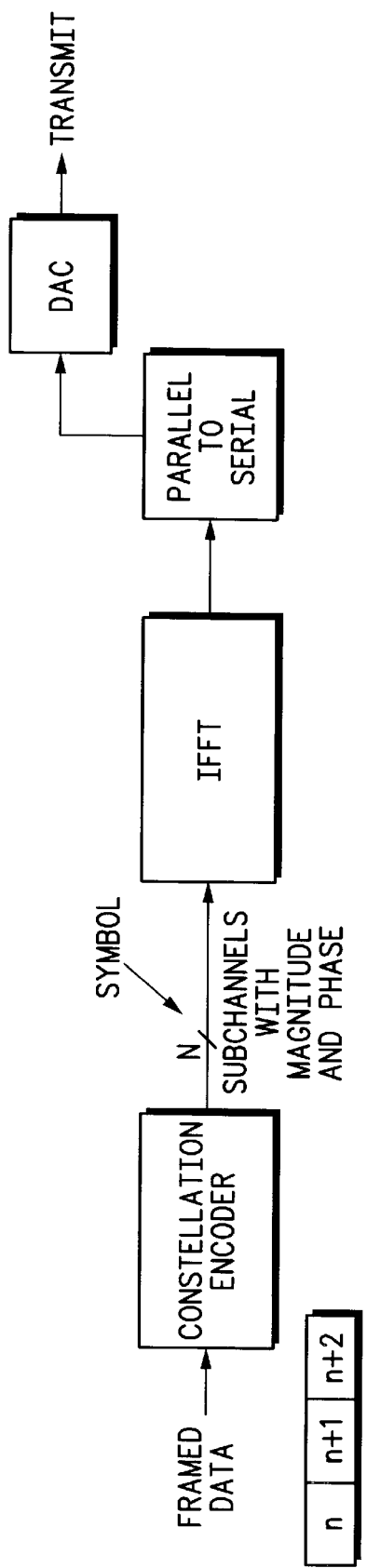
FIG. 2 illustrates, in a block diagram, a prior art Discrete Multi-Tone (DMT) transmitter.

FIG. 2 illustrates a DMT transmitter including a constellation encoder, an Inverse Fast Fourier Transform (IFFT) block, a parallel to serial converter, and a digital-to-analog converter (DAC). Framed data (frame n, n+1, and n+2) is presented to the constellation encoder which encodes the data based on the transmission capacity of the subchannels that are being utilized. The encoding is done by mapping the value of the bits for each subchannel into a frequency-domain vector. For example, if the capacity of a subchannel is six bits, the value of the six bits can be represented by one of $2^6$ frequency-domain vectors having a particular magnitude and phase. A set of N frequency-domain vectors is generated by encoding the appropriate number of bits onto each of the subchannels being used for transmission. The N frequency-domain vectors, or subchannels with magnitude and phase, are referred to as frequency-domain DMT symbols.

The frequency-domain DMT symbols are transformed, via the IFFT, into a time-domain DMT symbol. The data produced by the IFFT represents the entire time-domain DMT symbol in parallel digital format. The parallel data is converted to serial form in the parallel-serial block, and the serial digital data is converted to an analog transmit signal via the DAC. The transmit signal is then sent across the twisted pair, and the process is reversed at a receiver to recover the data.

Figure 3:
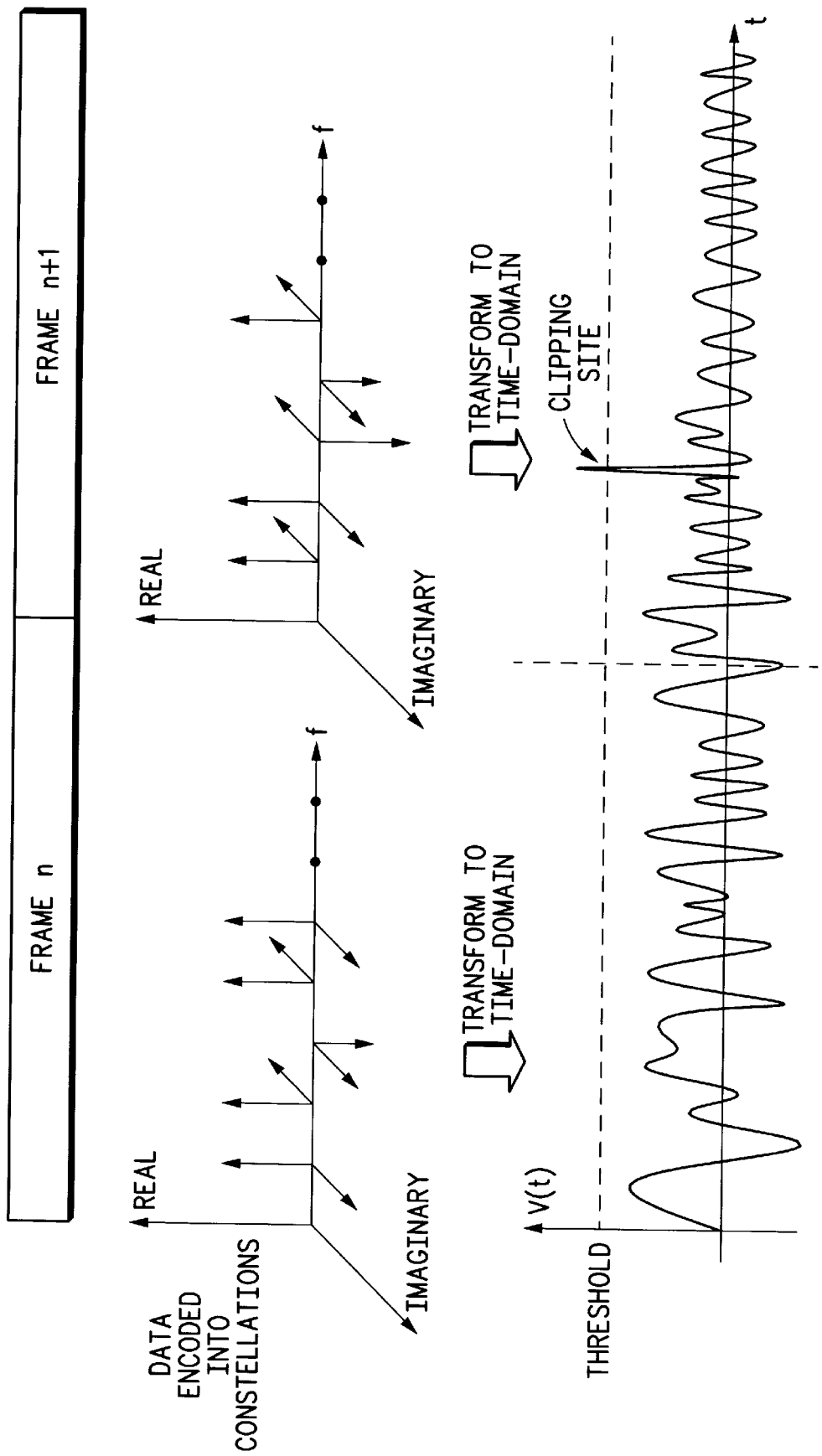
FIG. 3 illustrates, in a vector and waveform diagram, a prior art encoding technique utilized in DMT communications systems.

FIG. 3 illustrates the encoding and frequency-to-time conversion functions in more detail. The encoding of frames n and n+1 is shown for seven subchannels. Each subchannel is shown as having a real and an imaginary component, which can be combined to produce magnitude and phase in polar coordinates. Note that two of the subchannels shown have zero-value real and imaginary components, indicating that the subchannels are unable to transmit data, and are not being used. Therefore, in FIG. 3 each frequency-domain DMT symbol consists of a set of five vectors.

The analog signals that result from the frequency-to-time transformations of the two symbols includes a point in the second time-domain symbol where the peak magnitude of the analog signal exceeds the threshold. This clipping site is the result of combining similar time-domain contributions of the frequency-domain vectors. Clipping, such as at the clipping site depicted in FIG. 3, results in the loss of information as the transmitting system cannot support the peak power required.

Figure 4:
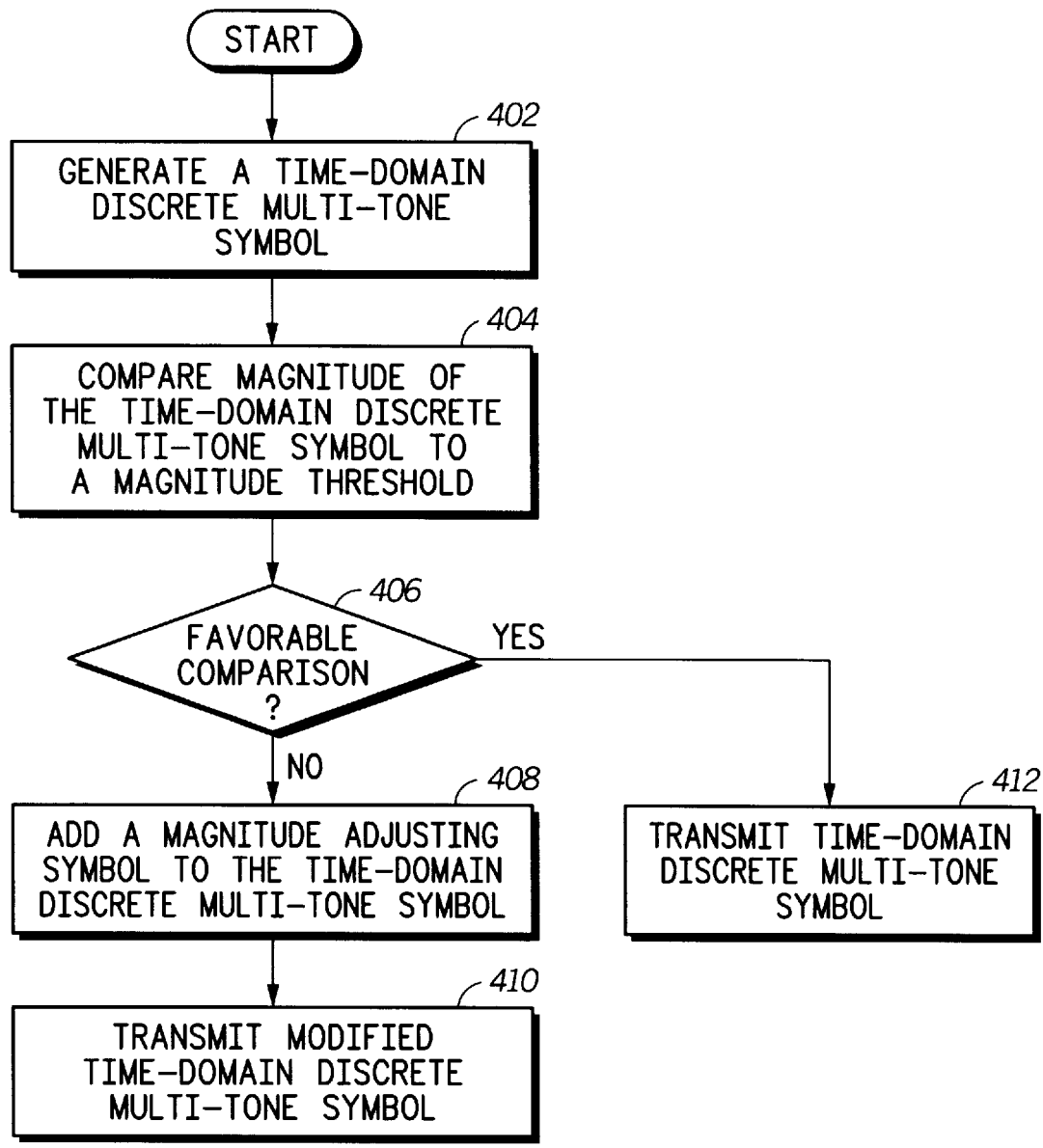
FIG. 4 illustrates, in a logic diagram, a method for reducing peak-to-average requirements in a discrete multi-tone transmitter in accordance with the present invention.

FIG. 4 illustrates a method for reducing the occurrence of clipping sites, by reducing the PAR in a DMT transmitter. In step 402, a time-domain discrete multi-tone (DMT) symbol is generated. The time-domain DMT symbol may be generated by combining a plurality of carrier channels (subchannels) to form a frequency-domain DMT symbol. The phase and magnitude of each of the plurality of carrier channels represents data, and the data equates to a time frame of a plurality of time frames that constitute a continuous signal. In an ADSL system, the time-domain DMT symbol is an ADSL time-domain DMT symbol, which results from performing a frequency-to-time transformation of the frequency-domain DMT symbol.

In step 404, the magnitude of the time-domain DMT symbol is compared with a magnitude threshold. If the comparison is favorable (the magnitude threshold is not exceeded), the time-domain DMT symbol is transmitted. If the comparison is not favorable (the time-domain DMT symbol exceeds the magnitude threshold at some point), a magnitude adjusting symbol is added to the time-domain DMT symbol such that the magnitude of the time-domain DMT symbol is reduced, thereby reducing the PAR.

The magnitude adjusting symbol is generated by taking advantage of subchannels that are not being used for data transmission. Frequency-domain vectors cain be generated for these subchannels which are added to the frequency-domain DMT symbol such that when the IFFT operation is performed, the contributions of the added frequency vectors reduce any peaks that occur from the subchannels that are being used to transmit data. For example, if a peak is known to occur in the time-domain DMT symbol, frequency vectors can be generated for unused subchannels such that the transform of the newly-generated frequency vectors approximates an opposite impulse function at the point where the peak occurs. The opposite impulse function is added to the DMT symbol by combining the newly-generated frequency vectors with the frequency-domain DMT symbol. The time-domain DMT symbol resulting from the IFFT of the modified frequency-domain DMT symbol is such that the opposite impulse function reduces the magnitude of the time-domain DMT symbol at the peak location. By reducing the magnitude of the time-domain DMT symbol at the appropriate point, the added opposite impulse function prevents the time-domain DMT symbol from being clipped during transmission.

Because the receiver does not take the unused frequencies, or subchannels, into account when it recovers the data, the added vectors used to create the time-domain impulse (magnitude adjusting symbol) will not alter the data that is received. Unused frequencies may exist because the twisted-pair connection attenuates signals on certain frequencies such that data transmitted on these frequencies are completely lost in transmission and never reach the receiver. If data on the frequencies used to generate the magnitude adjusting symbol does reach the receiver, the transmitter and receiver must both understand that these frequencies are being used for purposes other than data transmission, and signals received on them should be disregarded.

Figure 5:
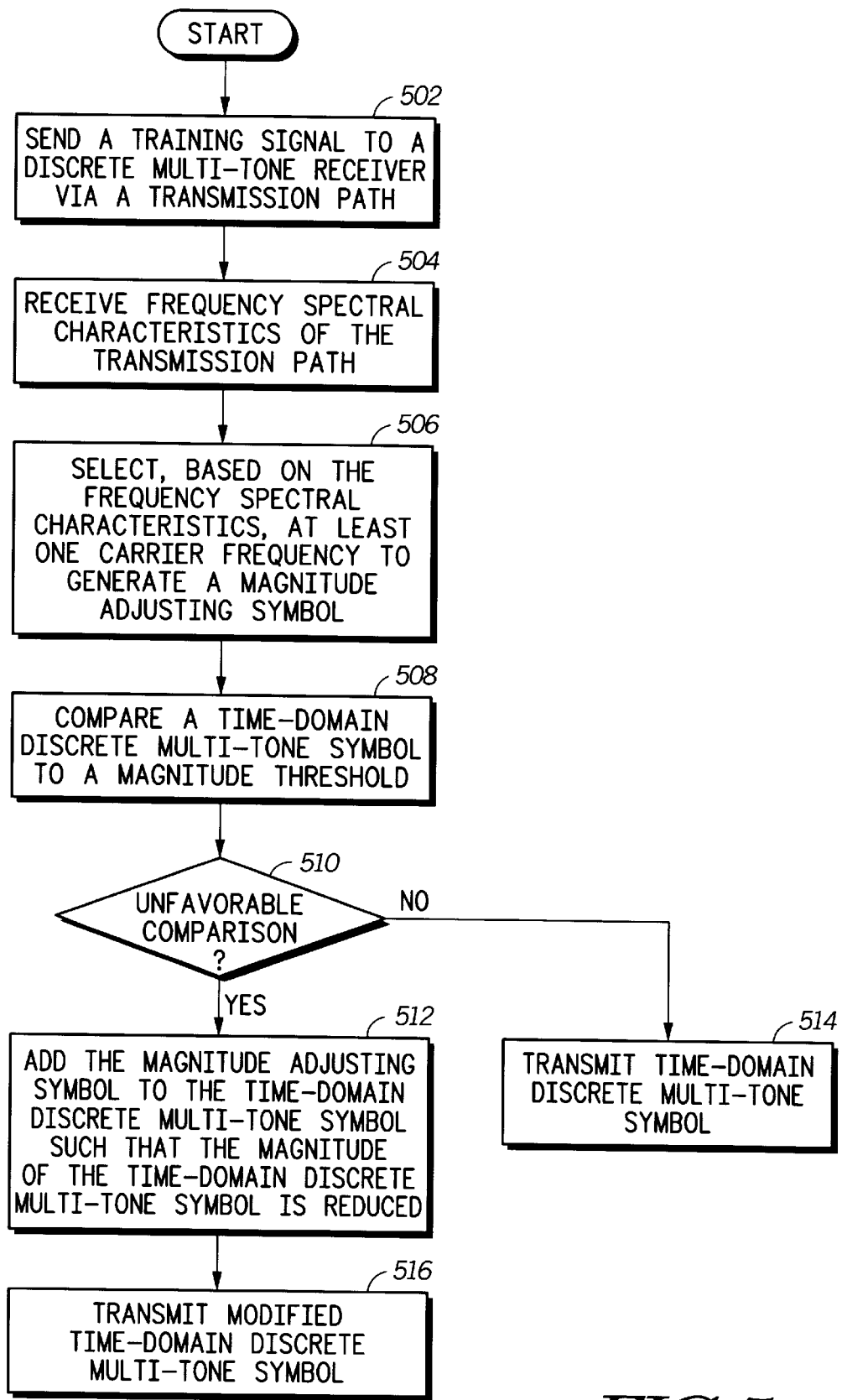
FIG. 5 illustrates, in a logic diagram, a method for reducing peak-to-average requirements in a discrete multi-tone transmitter in accordance with the present invention.

FIG. 5 illustrates an alternate method for reducing PAR in a DMT system. In step 502, a training signal is sent by a DMT transmitter to a DMT receiver over a transmission path, which is twisted pair in an ADSL system. In an ADSL system, the training signal is received by a receiver which compares what it receives with a copy of the original training signal. By comparing the actual received signal with an ideal signal, the frequency spectral characteristics of the transmission path can be determined. For example, if the training signal contains signals of some magnitude and phase at subchannels at 1 MHz, 1.05 MHz, and 1.08 MHz, but no signals are detected at 1 MHz and 1.08 MHz at the receiver, it can be ascertained that the transmission path cannot support information transmission at these two subchannels. At 1.05 MHz, the receiver receives a signal, but the resolution isn't adequate to support the maximum number of bits that can be allocated to a subchannel. In other words, data can be transmitted using the 1.05 MHz subchannel, but the number of bits it can carry will be limited. This information is communicated back to the transmitter. Thus, after sending the signal, the transmitter receives frequency spectral characteristics of the transmission path based on the transmission signal at step 504.

In step 506, the transmitter selects, based on the frequency spectral characteristics, at least one carrier frequency to support a magnitude adjusting symbol. In the example above, the transmitter would likely select the carriers at 1 MHz and/or 1.08 MHz. Recall that these carrier frequencies cannot be used for data transmission and using them for another purpose will not affect the bandwidth, or transmission capability, of the system.

In an alternate implementation, the receiver may select the at least one carrier frequency to support the magnitude adjusting symbol based on the training signal. In this instance, the receiver would communicate the identity of the carrier frequency or frequencies to be used for the magnitude adjusting symbol to the transmitter. In the example being discussed, the receiver would determine that, due to their poor data transmission capability, the carrier frequencies at 1 MHz and/or 1.08 MHz would be good choices for the magnitude adjusting symbol and communicate this information to the transmitter.

In yet another implementation, the transmitter may determine the carrier frequencies to be used for the magnitude adjusting symbol prior to the transmission of the training signal and adjust the training signal in such a way that the receiver will determine that the selected carrier frequencies are not suitable for data transmission. For example, if the transmitter wanted to select 1 MHz as a carrier frequency to use for the magnitude adjusting symbol, it would alter the training signal at 1 MHz such that the receiver would determine that 1 MHz was a poor frequency for data transmission.

A magnitude adjusting symbol can then be generated by generating a frequency spectral characteristic (using the selected carrier frequencies), wherein magnitude of the time-domain representation of the frequency spectral characteristic is such that, when combined with a time-domain DMT symbol, the magnitude of the time-domain DMT symbol is reduced. Because millions of different time-domain DMT symbol can be produced, with many different locations where peaks can occur, the magnitude adjusting symbol must be determined accordingly. In one implementation, the magnitude adjusting symbol may be an impulse function approximation that can be scaled in magnitude and shifted in time to allow quick computation of the appropriate magnitude adjusting symbol.

In step 508, the transmitter compares a time-domain DMT symbol to a magnitude threshold. Step 510 determines if it is an unfavorable comparison (clipping will occur).

If the comparison is favorable and no clipping will occur, the time-domain DMT symbol is transmitted in step 514. If the comparison is unfavorable, the magnitude adjusting symbol is added to the time-domain DMT symbol at step 512 such that the magnitude of the time-domain DMT symbol is reduced, thereby reducing PAR. The modified time-domain DMT symbol is then transmitted at step 516.

Figure 6:
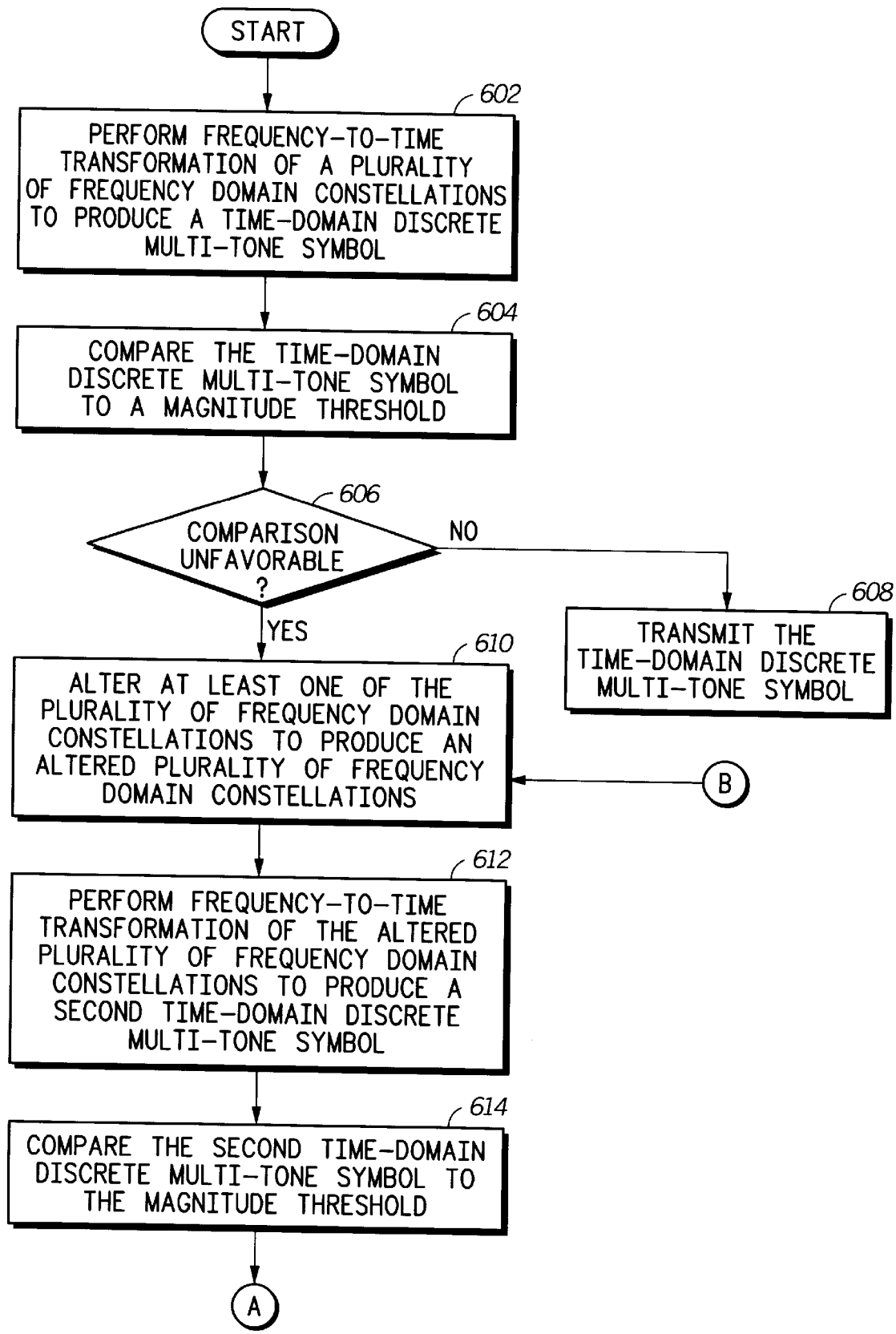
FIG. 6 and FIG. 7 illustrate, in a logic diagram, a method for adjusting a peak magnitude condition in a time-domain discrete multi-tone symbol in accordance with the present invention.
Figure 7:
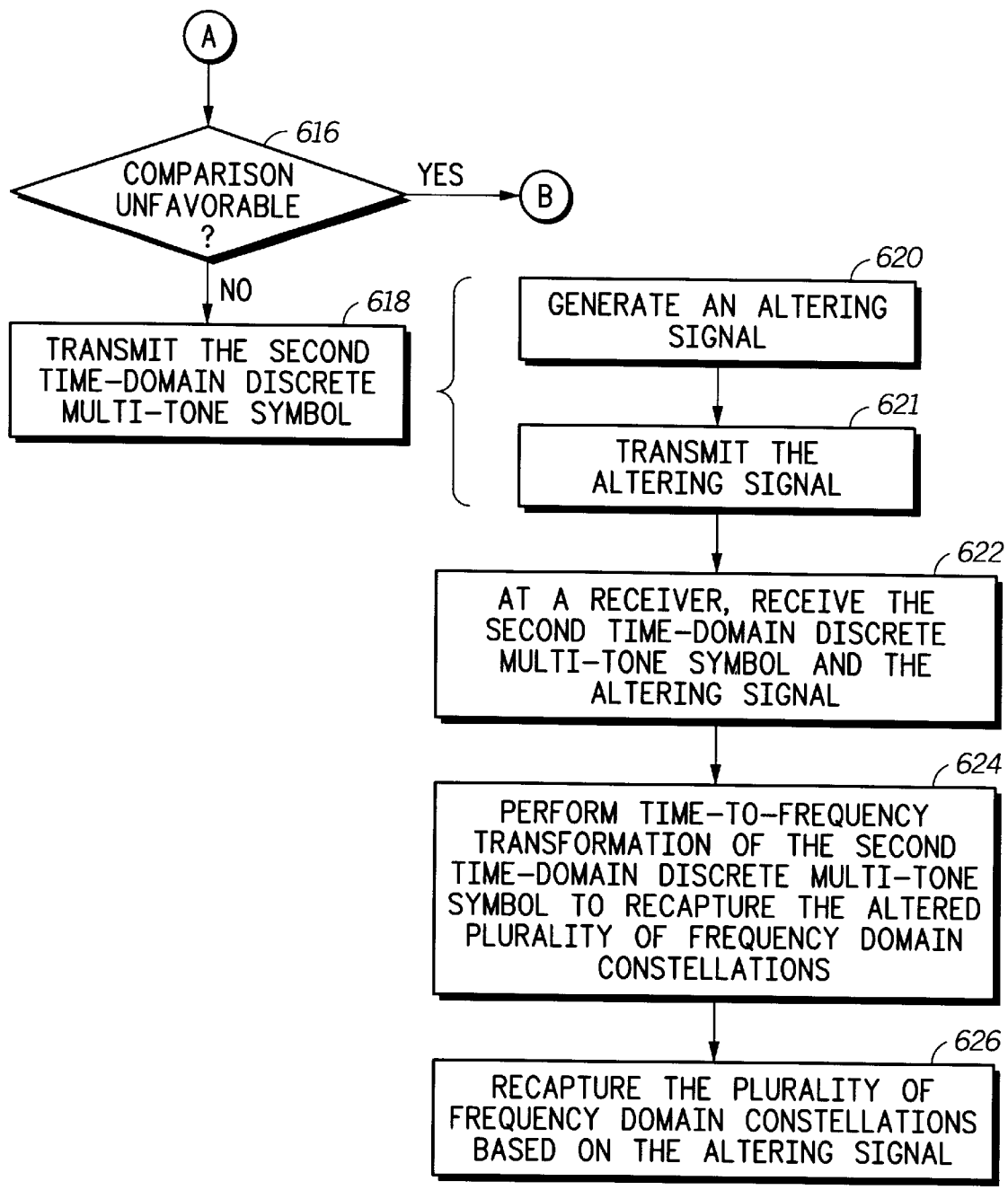

FIG. 6 and FIG. 7 illustrate a method for adjusting a peak magnitude condition in a time-domain DMT symbol. In step 602, frequency-to-time transformation is performed on a plurality of frequency-domain constellations to produce a time-domain DMT symbol. In an ADSL system, an IFFT function can be used to transform the frequency-domain constellations, or vectors having magnitude and phase, into a time-domain ADSL symbol. The time-domain DMT symbol is compared to a magnitude threshold at step 604, which is similar to step 508 of FIG. 5.

When it is determined, at step 606, that the comparison is favorable, the time-domain DMT symbol is transmitted at step 608. When it is determined, at step 606, that the comparison is unfavorable, at least one of the plurality of frequency-domain constellations is altered at step 610 to produce an altered plurality of frequency-domain constellations. If a certain magnitude and phase mapping are used to represent the values of the encoded bits in the unaltered frequency-domain constellations, a second mapping may be used to produce the altered frequency-domain constellations. In another embodiment, the means of altering the frequency-domain constellations may involve replacing every other constellation with its complex conjugate. Any number of differing altering methods can be employed, as long as the method is understood by the transmitting and receiving stations.

At step 612, frequency-to-time transformation is performed on the altered plurality of frequency-domain constellations to produce a second time-domain DMT symbol. The second time-domain DMT symbol is then compared to the magnitude threshold at step 614. If the comparison is determined to be unfavorable at step 616, the second time-domain DMT symbol will be itself altered beginning at step 610 in such a way to produce a third time-domain DMT symbol which is different from the other two time-domain DMT symbols which have already compared unfavorably with the magnitude threshold.

If the comparison is determined to be favorable at step 618, the second time-domain DMT symbol is transmitted. If the altering technique that produced the second time-domain DMT symbol is such that the receiver can determine whether a time-domain DMT symbol has been altered and can recover the original time-domain DMT symbol whether or not it has been altered, the second time-domain DMT symbol can be transmitted alone. If, however, the altering technique is such that the receiver needs to be notified of the alteration, an altering signal may be generated at step 620 based on the alteration of the at least one of the frequency-domain constellations. The altering signal is then transmitted at step 621 along with the second time-domain DMT symbol, wherein the altering signal characterizes the alteration of at least one of the frequency-domain constellations.

At step 622, a receiver receives the second time-domain DMT symbol and the altering signal. Time-to-frequency transformation of the second time-domain DMT symbol is performed at step 624 to recapture the altered plurality of frequency-domain constellations. At step 626, the plurality of frequency-domain constellations (unaltered) is recaptured based on the altering signal.

Figure 8:
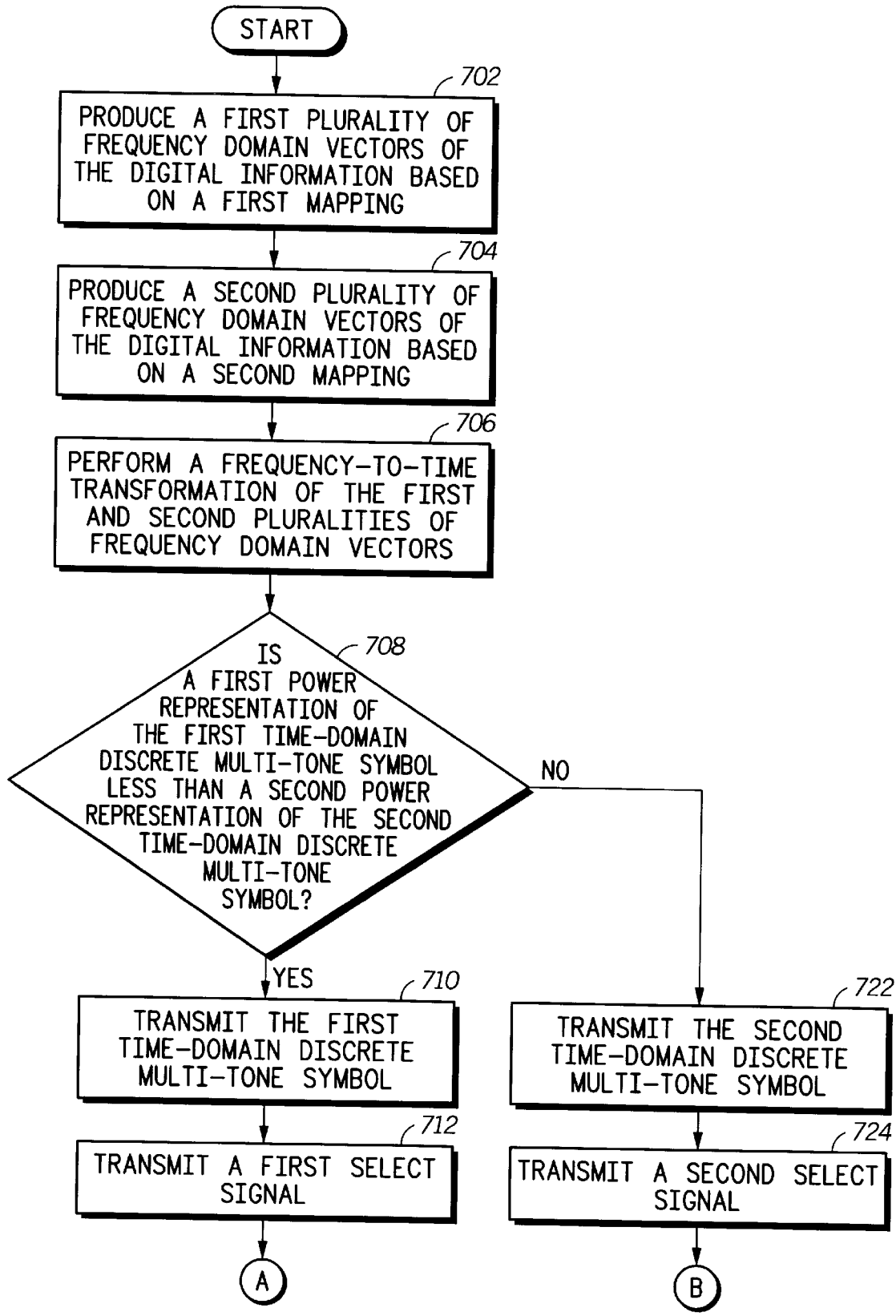
FIG. 8 and FIG. 9 illustrate, in a logic diagram, a method for reducing peak-to-average requirements in a discrete multi-tone transmitter in accordance with the present invention.
Figure 9:
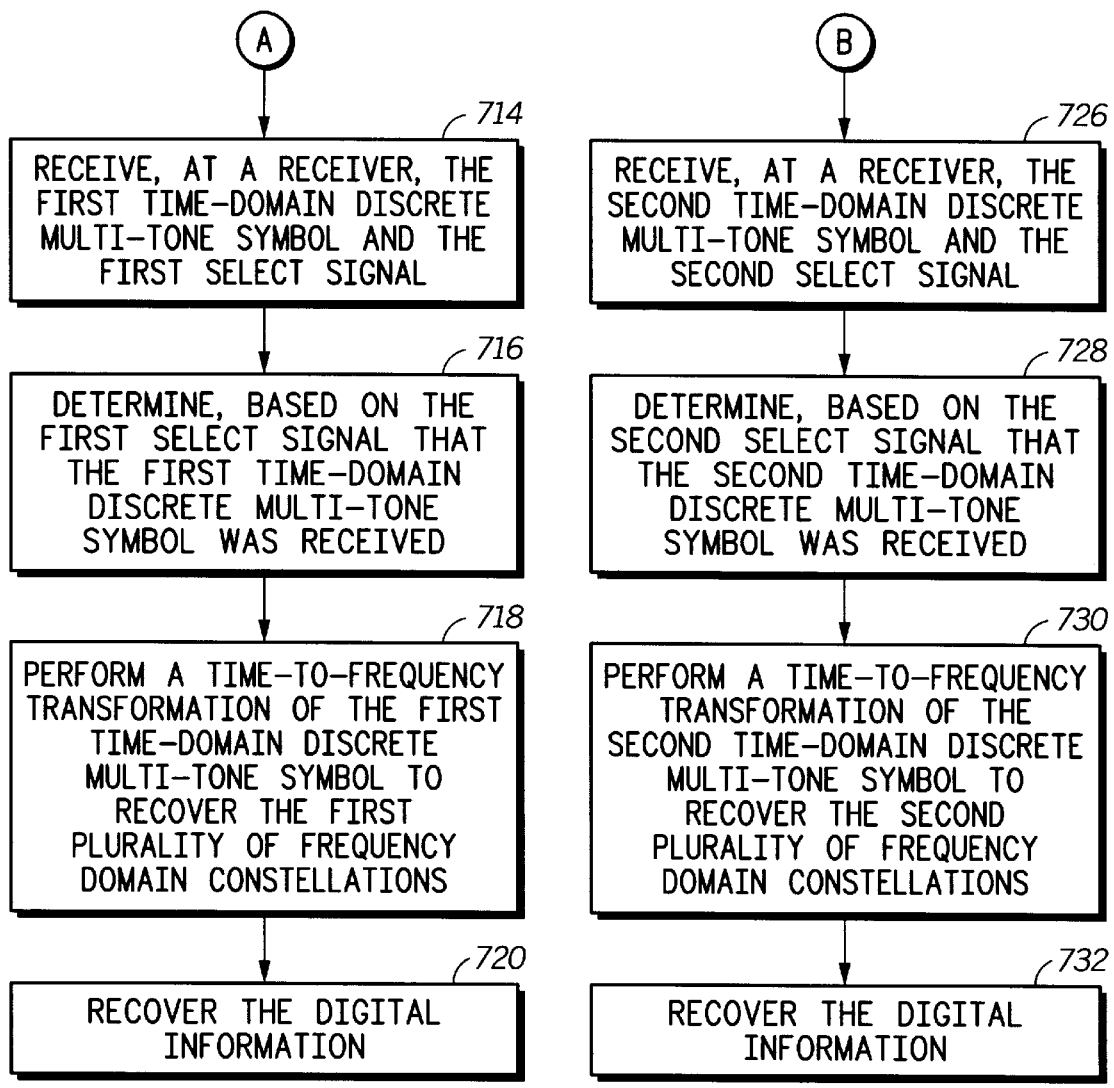

FIG. 8 and FIG. 9 illustrate an alternate method of reducing PAR in a DMT transmitter. In step 702, a first plurality of frequency-domain vectors representing digital information is produced based on a first mapping. The magnitude and phase of the frequency-domain vectors are used to encode the values of the digital information, and the encoding is determined by the mapping. The mapping provides a point in the complex plane for each possible value of the digital information. A vector drawn from the origin to a point of the "map" has a unique magnitude and phase components that represents the value that corresponds to that particular point. In step 704, a second plurality of frequency-domain vectors representing the digital information is produced based on a second mapping. The magnitude and phase used to encode a certain digital value in the first mapping will not be the same in the second mapping, and the two pluralities of frequency-domain vectors will be different representations of the same digital information.

At step 706, frequency-to-time transformation of the first and second pluralities of frequency-domain vectors is performed to produce a first time-domain DMT symbol and a second time-domain DMT symbol respectively. This is similar to step 602 of FIG. 6. In step 708, a first power representation of the first time-domain DMT symbol and a second power representation of the second time-domain DMT symbol are compared. In one embodiment, the peak power of the two DMT symbols may be compared. By using peak power as the power representation, the only time that clipping will occur is if both the first time-domain DMT symbol and the second time-domain DMT symbol contain peaks that would be clipped.

If the first power representation is determined to be less than the second power representation in step 708, the first time-domain DMT symbol is transmitted at step 710. When the first time-domain DMT symbol is transmitted at step 710, a first select signal may be transmitted at step 712, wherein the first select signal indicates that the first time-domain DMT symbol is selected for transmission. The first time-domain DMT symbol and the first select signal are received at a receiver in step 714. In step 716, the receiver determines, based on the first select signal, that the first time-domain DMT symbol was received. Time-to-frequency transformation of the first time-domain DMT symbol is performed at step 718 to recover the first plurality of frequency-domain constellations, and the digital information can then be recovered at step 720 based on the first plurality of frequency-domain constellations and the first mapping.

If the second power representation is determined to be less than the first power representation in step 708, the second time-domain DMT symbol is transmitted at step 722. When the second time-domain DMT symbol is transmitted at step 722, a second select signal may be transmitted at step 724, wherein the second select signal indicates that the second time-domain DMT symbol is selected for transmission. The second time-domain DMT symbol and the second select signal are received at a receiver in step 726. In step 728, the receiver determines, based on the second select signal, that the second time-domain DMT symbol was received. Time-to-frequency transformation of the second time-domain DMT symbol is performed at step 718 to recover the second plurality of frequency-domain constellations, and the digital information can then be recovered at step 720 based on the second plurality of frequency-domain constellations and the second mapping.

By always (selecting the time-domain DMT symbol with the smaller peak magnitude via the method illustrated in FIG. 8 and FIG. 9, the PAR of the system is effectively reduced. This system is easily extended to include more than two unique mappings, which would provide additional time-domain DMT symbols to select from for transmission.

Figure 10:
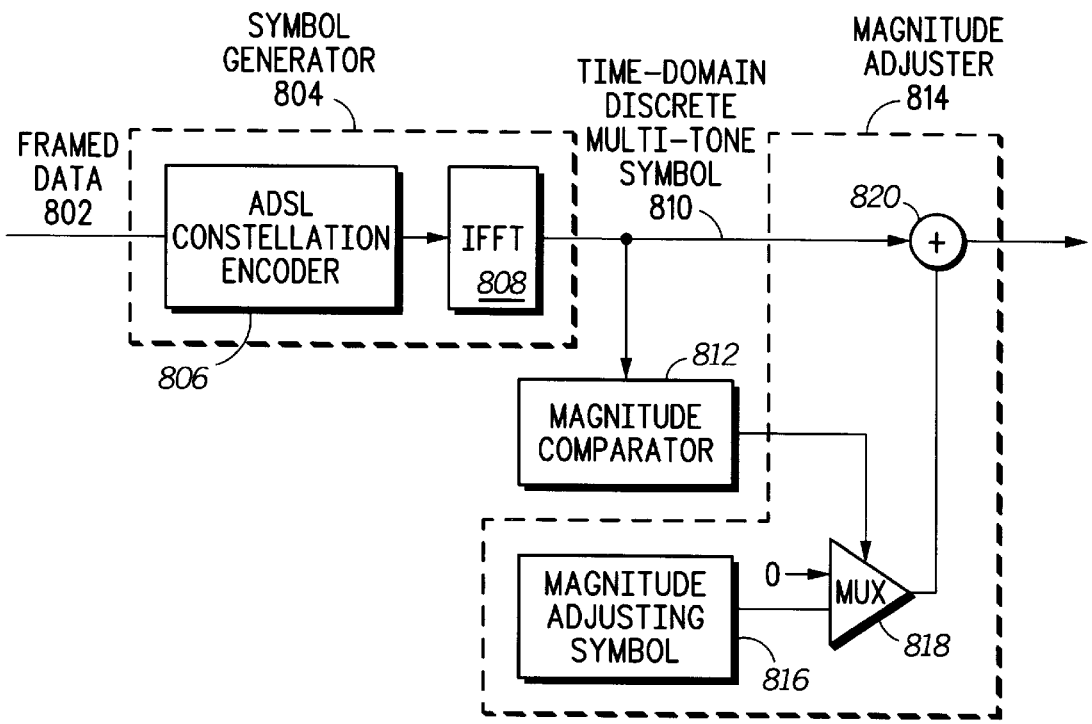
FIG. 10 illustrates, in a block diagram, a discrete multi-tone transmitter in accordance with the present invention.

FIG. 10 illustrates a DMT transmitter including a symbol generator 804, a magnitude comparator 812, and a magnitude adjuster 814. The DMT transmitter receives framed data 802 at the symbol generator 804 and generates a time-domain DMT symbol 810 based on the framed data 802. In an ADSL system, the symbol generator 804 includes an ADSL constellation encoder 806 and an IFFT block 808. The ADSL constellation encoder 806 encodes the framed data 802 by mapping the values of the data bits to frequency-domain vectors on subchannels within the bandwidth used for ADSL transmission. The number of bits that can be encoded on each subchannel may be determined by sending a training signal, as is detailed in FIG. 5. The IFFT block 808 transforms the frequency-domain vectors to the time-domain, resulting in a time-domain DMT symbol 810.

The magnitude comparator 812 compares the magnitude of the time-domain DMT symbol 810 to a magnitude threshold to determine if clipping will occur. The magnitude adjuster 814 includes a magnitude adjusting symbol 816, a multiplexer or mux 818, and an adder 820. When the magnitude comparator 812 determines that the magnitude of the time-domain DMT symbol 810 is such that clipping will occur, it directs the mux 818 to pass the magnitude adjusting symbol 816 to the adder 820 which adds it to the time-domain DMT symbol 810 such that magnitude of the time-domain DMT symbol 810 is reduced, effectively reducing the PAR of the system.

Figure 11:
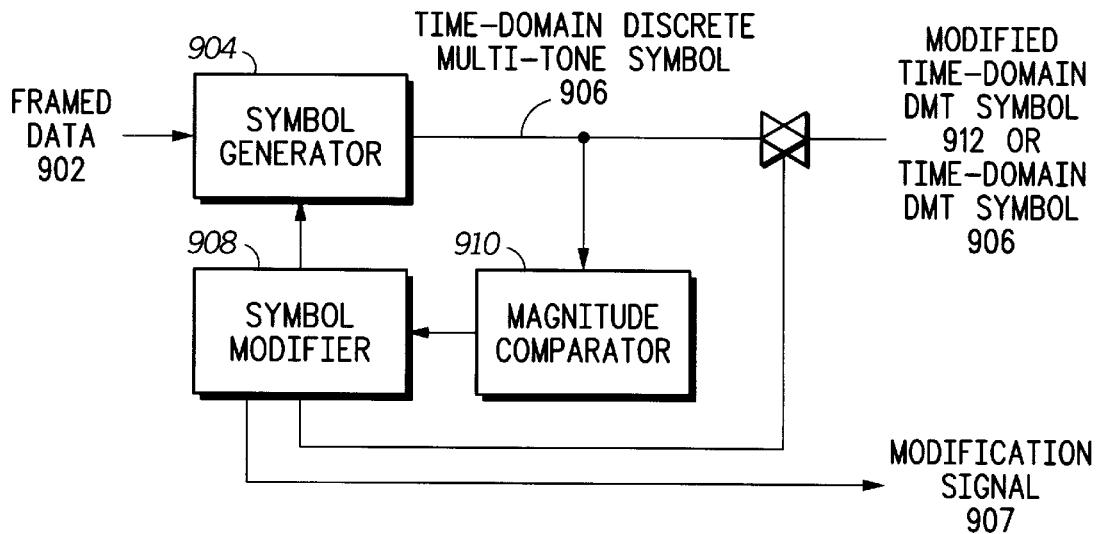
FIG. 11 illustrates, in a block diagram, a discrete multi-tone transmitter in accordance with the present invention.

FIG. 11 illustrates an alternate embodiment of a DMT transmitter which includes a symbol generator 904, a magnitude comparator 910, and a symbol modifier 908. The symbol generator 904 generates a time-domain DMT symbol 906 based on the framed data 902. The magnitude comparator 910 compares the magnitude of the time-domain DMT symbol 906 to a magnitude threshold to determine if clipping will occur. When the magnitude of the time-domain DMT symbol 906 compares unfavorably to the magnitude threshold, the symbol modifier 908 modifies the time-domain DMT symbol 906 to produce a modified time-domain DMT symbol 912 of reduced magnitude. The symbol modifier 908 may modify the symbol by altering the mapping function used for encoding the data, altering certain vectors in the frequency-domain representation of the DMT symbol, etc. The symbol modifier 908 may also produce a modification signal 907, wherein the modification signal 907 characterizes the modified time-domain DMT symbol 912.

Figure 12:
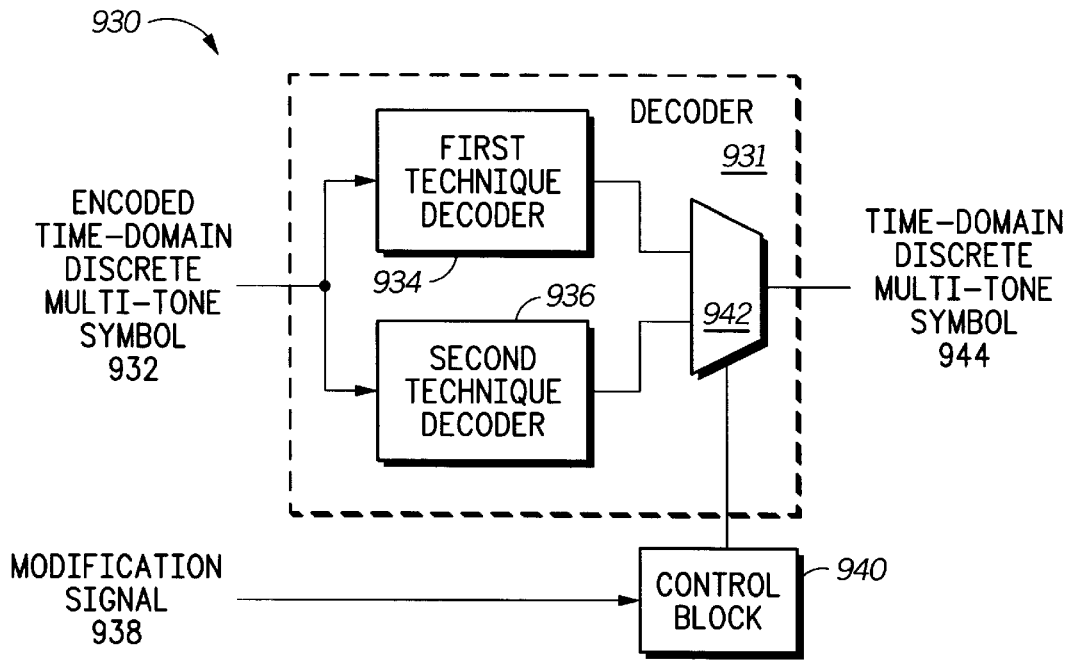
FIG. 12 illustrates, in a block diagram, a discrete multi-tone receiver in accordance with the present invention.

FIG. 12 illustrates a DMT receiver 930 which could be used in conjunction with an embodiment of the transmitter illustrated in FIG. 11. The receiver 930 includes a control block 940 which receives a modification signal 938 that characterizes an encoded time-domain DMT symbol 932. In the embodiment illustrated, the encoded time-domain DMT symbol 932 can be encoded using two different encoding methods, i.e. two different mappings, etc., and the modification signal 938 indicates which of the two encoding methods was used.

A decoder 931 receives the encoded time-domain DMT symbol 932 and decodes it using a first technique decoder 934 and a second technique decoder 936, where each of the two decoders 934 and 936 reverse one of the two potential encoding methods. A mux 942 controlled by the control block 940 selects one of the two decoding techniques to recover the time-domain DMT symbol 944. Thus, the decoder 931 decodes the encoded time-domain DMT symbol 932 using a first technique when the modification signal 938 has a first value, decodes the encoded time-domain DMT symbol 932 using a second technique when the modification signal 938 has a second value, and recovers the time-domain DMT symbol 944. The embodiment shown is easily expanded to include a larger number of encoding and decoding techniques.

Figure 13:
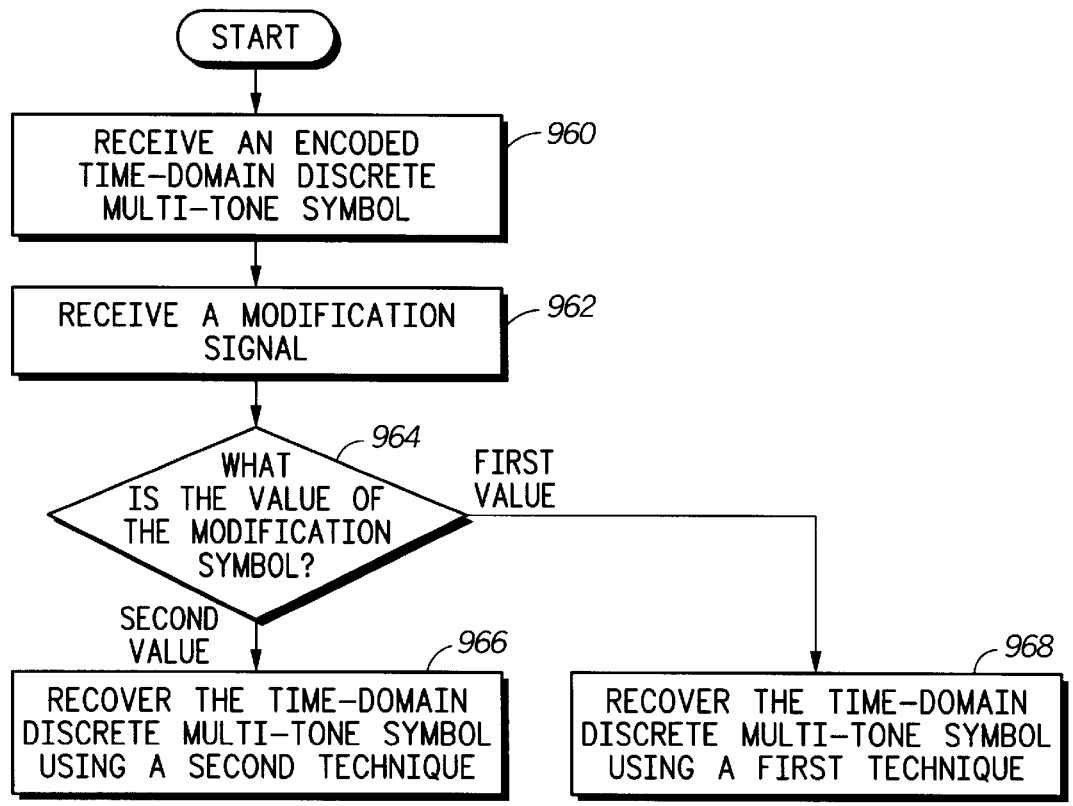
FIG. 13 illustrates, in a logic diagram, a method for recovering a time-domain discrete multi-tone symbol in a discrete multi tone receiver in accordance with the present invention.

FIG. 13 illustrates a method for recovering a time-domain DMT symbol in a receiver. In step 960 an encoded time-domain DMT symbol is received. A modification signal that characterizes the encoded time-domain DMT symbol is received in step 962. Step 964 makes a decision depending on the value of the modification signal. When the modification signal has a first value, the time-domain DMT symbol is recovered from the encoded time-domain DMT symbol using a first technique in step 968. When the modification signal has a second value, the time-domain DMT symbol is recovered from the encoded time-domain DMT symbol using a second technique in step 966.

The present invention provides a method and apparatus for reducing peak-to-average requirements in discrete multi-tone communication circuits which provides many benefits. For example, the power supply voltage and signal strength of the system can be maintained while reducing the probability of clipping, which reduces information loss in the system. An alternative benefit is to maintain the power supply voltage and probability of clipping while increasing the signal strength, thus reducing susceptibility to noise. Alternatively, the probability of clipping and signal strength can be maintained while reducing the power supply voltage, which will provide reduced cost and avoid excessive power consumption. As a further alternative, power supply voltage can be reduced, signal strength can be increased, and probability of clipping can be reduced simultaneously to provide similar benefits to a greater or lesser degree than when done individually.

We claim:

1. In a discrete multi-tone transmitter, a method for reducing peak-to-average requirements, the method comprising the steps of:
   a) generating a time-domain discrete multi-tone symbol;
   b) comparing a magnitude of the time-domain discrete multi-tone symbol to a magnitude threshold; and
   c) selecting based on expected frequency spectral characteristics, at least one carrier frequency of a plurality of carrier frequencies to support a magnitude adjusting symbol; and
   d) when the magnitude of the time-domain discrete multi-tone symbol compares unfavorably to the magnitude threshold, adding the magnitude adjusting symbol to the time-domain discrete multi-tone symbol such that the magnitude of the time-domain discrete multi-tone symbol is reduced, thereby reducing the peak-to-average requirements of the transmitter.

2. The method of claim 1, wherein the step of generating a time-domain discrete multi-tone symbol further comprises generating an Asymmetric Digital Subscriber Line symbol.

3. The method of claim 1, wherein the step of generating a time-domain discrete multi-tone symbol further comprises combining a plurality of carrier channels, wherein phase and magnitude of each of the plurality of carrier channels represents data.

4. The method of claim 1, wherein the step of generating a time-domain discrete multi-tone symbol further comprises generating a time-domain discrete multi-tone symbol, wherein the time-domain discrete multi-tone symbol equates to a time frame of a plurality of time-frames.

5. In a discrete multi-tone transmitter, a method for reducing peak-to-average requirements, the method comprising the steps of:
   a) sending a training signal to a discrete multi-tone receiver via a transmission path;
   b) in response to sending the training signal, the transmitter receiving frequency spectral characteristics of the transmission path based on the training signal;
   c) selecting, based on the frequency spectral characteristics, at least one carrier frequency of a plurality of carrier frequencies to support a magnitude adjusting symbol; and
   d) when a time-domain discrete multi-tone symbol compares unfavorably to a magnitude threshold, adding the magnitude adjusting symbol to the time-domain discrete multi-tone symbol such that magnitude of the time-domain discrete multi-tone symbol is reduced, thereby reducing peak-to-average requirements of the transmitter.

6. A method for adjusting a peak magnitude condition in a time-domain discrete multi-tone symbol, the method comprising:
   a) performing frequency-to-time transformation of a plurality of frequency-domain constellations to produce a time-domain discrete multi-tone symbol;
   b) comparing the time-domain discrete multi-tone symbol to a magnitude threshold;
   c) when the time-domain discrete multi-tone symbol compares unfavorably to the magnitude threshold, altering at least one of the plurality of frequency-domain constellations to produce an altered plurality of frequency-domain constellations;
   d) performing frequency-to-time transformation of the altered plurality of frequency-domain constellations to produce a second time-domain discrete multi-tone symbol;
   e) comparing the second time-domain discrete multi-tone symbol to the magnitude threshold; and
   f) when the second time-domain discrete multi-tone symbol compares favorably to the magnitude threshold, transmitting the second time-domain discrete multi-tone symbol.

7. The method of claim 6, wherein step f) further comprises:
   generating an altering signal based on the altering of the at least one of the plurality of frequency-domain constellations; and
   transmitting the altering signal along with the second time-domain discrete multi-tone symbol, wherein the altering signal characterizes the altering of at least one of the plurality of frequency-domain constellations.

8. The method of claim 7 further comprises:
   at a receiver, receiving the second time-domain discrete multi-tone symbol and the altering signal;
   performing time-to-frequency transformation of the second time-domain discrete multi-tone symbol to recapture the altered plurality of frequency-domain constellations; and recapturing the plurality of frequency-domain constellations from the altered plurality of frequency-domain constellations based on the altering signal.

9. The method of claim 6, wherein the step of performing frequency-to-time transformation of a plurality of frequency-domain constellations to produce a time-domain discrete multi-tone symbol comprises performing frequency-to-time transformation of a plurality of frequency-domain constellations to produce an Asymmetric Digital Subscriber Line symbol.

10. In a discrete multi-tone transmitter, a method for reducing peak-to-average requirements, the method comprising the steps of:

a) producing a first plurality of frequency-domain vectors representing digital information based on a first mapping;

b) producing a second plurality of frequency-domain vectors representing the digital information based on a second mapping;

c) performing a frequency-to-time transformation of the first and second pluralities of frequency-domain vectors to produce a first time-domain discrete multi-tone symbol and a second time-domain discrete multi-tone symbol, respectively;

d) producing a first power representation of the first time-domain discrete multi-tone symbol and a second power representation of the second time-domain discrete multi-tone symbol;

e) comparing the first power representation of the first time-domain discrete multi-tone symbol and the second power representation of the second time-domain discrete multi-tone symbol;

f) transmitting the first time-domain discrete multi-tone symbol when the first power representation is less than the second power representation; and g) transmitting the second time-domain discrete multi-tone symbol when the second power representation is less than the first power representation.

11. The method of claim 10 further comprises:

e) transmitting a first select signal, wherein the first select signal indicates that the first time-domain discrete multi-tone symbol is selected for transmission; and f) transmitting a second select signal, wherein the second select signal indicates that the second time-domain discrete multi-tone symbol is selected for transmission.

12. The method of claim 11 further comprises:

i) receiving, at a receiver, the first time-domain discrete multi-tone symbol and the first select signal;

ii) determining, based on the first select signal, that the first time-domain discrete multi-tone symbol was received;

iii) performing a time-to-frequency transformation of the first time-domain discrete multi-tone symbol to recover the first plurality of frequency-domain vectors; and iv) recovering the digital information based on the first plurality of frequency-domain vectors and the first mapping.

13. The method of claim 11 further comprises:

i) receiving, at a receiver, the second time-domain discrete multi-tone symbol and the second select signal;

ii) determining, based on the second select signal, that the second time-domain discrete multi-tone symbol was received;

iii) performing a time-to-frequency transformation of the second time-domain discrete multi-tone symbol to recover the second plurality of frequency-domain vectors; and iv) recovering the digital information based on the second plurality of frequency-domain vectors and the second mapping.

14. A discrete multi-tone transmitter comprising:

a symbol generator, wherein the symbol generator generates a time-domain discrete multi-tone symbol;

a magnitude comparator, wherein the magnitude comparator compares magnitude of the time-domain discrete multi-tone symbol to a magnitude threshold;

a magnitude adjusting symbol, wherein the magnitude adjusting symbol is based on expected frequency spectral characteristics of a transmission path, and at least one carrier frequency of a plurality of carrier frequencies support the magnitude adjusting symbol; and a magnitude adjuster, wherein, when the time-domain discrete multi-tone symbol compares unfavorably to the magnitude threshold, the magnitude adjuster adds the magnitude adjusting symbol to the time-domain discrete multi-tone symbol such that magnitude of the time-domain discrete multi-tone symbol is reduced.

15. The discrete multi-tone transmitter of claim 14, wherein the symbol generator comprises an Asymmetric Digital Subscriber Line constellation encoder.

16. A discrete multi-tone transmitter comprising:

a symbol generator, wherein the symbol generator generates a time-domain discrete multi-tone symbol;

a magnitude comparator, wherein the magnitude comparator compares a magnitude of the time-domain discrete multi-tone symbol to a magnitude threshold; and a symbol modifier, wherein when the magnitude of the time-domain discrete multi-tone symbol compares unfavorably, the symbol modifier modifies the time-domain discrete multi-tone symbol to produce a modified time-domain discrete multi-tone symbol of reduced magnitude, and wherein the symbol modifier producing a modification signal, wherein the modification signal characterizes the modified time-domain discrete multi-tone symbol.

* * * * *